United States Patent
Hanes, Jr. et al.

(10) Patent No.: US 7,687,441 B2
(45) Date of Patent: Mar. 30, 2010

(54) BORONIC ACID NETWORKING AGENTS AND ASSOCIATED METHODS

(75) Inventors: Robert E. Hanes, Jr., Oklahoma City, OK (US); Jimmie D. Weaver, Duncan, OK (US); Billy F. Slabaugh, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 588 days.

(21) Appl. No.: 10/972,642

(22) Filed: Oct. 25, 2004

(65) Prior Publication Data

US 2006/0089265 A1    Apr. 27, 2006

(51) Int. Cl.
*C09K 8/588* (2006.01)
*C09K 8/68* (2006.01)

(52) U.S. Cl. .................... 507/261; 507/211; 507/213; 507/217; 507/219; 507/260; 507/254; 507/263; 507/264; 166/308.2

(58) Field of Classification Search .................. None
See application file for complete search history.

(56) References Cited

U.S. PATENT DOCUMENTS

| | | | | |
|---|---|---|---|---|
| 4,619,776 | A * | 10/1986 | Mondshine | 507/211 |
| 5,224,546 | A * | 7/1993 | Smith et al. | 166/300 |
| 5,273,580 | A * | 12/1993 | Totten et al. | 106/724 |
| 5,373,901 | A | 12/1994 | Norman et al. | |
| 5,445,223 | A * | 8/1995 | Nelson et al. | 166/308.5 |
| 5,681,796 | A * | 10/1997 | Nimerick | 507/209 |
| 5,877,127 | A | 3/1999 | Card et al. | |
| 6,024,170 | A * | 2/2000 | McCabe et al. | 166/300 |
| 6,060,436 | A * | 5/2000 | Snyder et al. | 507/266 |
| 6,242,390 | B1 * | 6/2001 | Mitchell et al. | 507/211 |
| 6,444,316 | B1 | 9/2002 | Reddy et al. | |
| 6,488,091 | B1 | 12/2002 | Weaver et al. | |
| 6,527,051 | B1 | 3/2003 | Reddy et al. | |
| 6,554,071 | B1 | 4/2003 | Reddy et al. | |
| 7,000,702 | B2 * | 2/2006 | Hanes et al. | 166/308.5 |
| 7,013,974 | B2 * | 3/2006 | Hanes, Jr. | 166/279 |
| 7,082,995 | B2 * | 8/2006 | Hanes et al. | 166/279 |
| 2003/0144154 | A1 * | 7/2003 | Dobson et al. | 507/200 |
| 2006/0003900 | A1 * | 1/2006 | Hanes | 507/203 |

OTHER PUBLICATIONS

U.S. Appl. No. 10/664,206, filed Sep. 9, 2003, Hanes, et al.
U.S. Appl. No. 10/794,607, filed Mar. 5, 2004, Hanes, et al.
U.S. Appl. No. 10/668,807, filed Sep. 23, 2003, Hanes, et al.
Jerry March, Advanced Organic Chemistry: Reactions, Mechanisms, and Structure 386-87 (John Wiley & Sons Inc., 4th ed. 1992).
Richard C. Larock, Comprehensive Organic Transformations 446-48 (Wiley-VCH, 2nd ed. 1989).

* cited by examiner

*Primary Examiner*—James Seidleck
*Assistant Examiner*—John J Figueroa
(74) *Attorney, Agent, or Firm*—Robert A. Kent; Baker Botts LLP

(57) ABSTRACT

In one embodiment, the present invention provides a method of increasing the viscosity of a treatment fluid comprising the steps of: adding a networking agent to the treatment fluid, wherein the networking agent is represented by the formula: Y—X—[B(OR)2]n, wherein: Y is at least partially capable of forming a crosslink between a gelling agent molecule, a second networking agent, and/or a combination thereof; X is at least partially capable of preventing or inhibiting a reaction represented by the formula: ROH+R'B(OR)2→R'OH+B(OR)3; R and R' are a hydrogen, an alkyl group, an aryl group, or a combination thereof; and n is a positive integer greater than or equal to 1; allowing at least one crosslink to form between the networking agent and a gelling agent molecule, a second networking agent, and/or a combination thereof; and allowing the viscosity of the treatment fluid to increase. Methods of treating a portion of a subterranean formation, networking agent compositions, and treatment fluid compositions also are provided.

27 Claims, No Drawings

BORONIC ACID NETWORKING AGENTS AND ASSOCIATED METHODS

BACKGROUND

The present invention relates to methods and compositions for viscosifying fluids. More particularly, the present invention relates to networking agents, viscosified treatment fluids, and methods of using these compositions in applications wherein viscosified treatment fluids may be used.

Many industrial applications require viscosified fluids or "treatment fluids." For instance, the upstream energy industry uses treatment fluids in a variety of production and stimulation operations. For example, a treatment fluid may be used to drill a borehole in a subterranean formation, to stimulate a well bore in a subterranean formation, or to clean up a well bore in a subterranean formation, as well as for numerous other purposes. As used herein, "treatment fluid" refers to any fluid that may be used in a subterranean application in conjunction with a desired function and/or for a desired purpose. The term "treatment fluid" does not imply any particular action by or with the fluid. Oftentimes treatment fluids used in subterranean applications are viscosified. While such fluids may be used for many purposes, one such purpose is to transport solid particulates such as proppant or gravel. Treatment fluids generally have a viscosity that is sufficiently high to suspend particulates for a desired period of time, to transfer hydraulic pressure, and/or to prevent undesired leak-off of fluids into the formation.

Treatment fluids that are used in subterranean operations generally are aqueous-based fluids that comprise a gelling agent. These gelling agents may comprise biopolymers or synthetic polymers. Some common gelling agents include, e.g., galactomannan gums, cellulose derivatives, and other polysaccharides.

The viscosity of a treatment fluid containing a gelling agent may be increased by crosslinking at least some of the gelling agent molecules with a crosslinking agent that may be added to the treatment fluid. Typical crosslinking agents generally comprise a metal, transition metal, or metalloid, collectively referred to herein as "metal(s)." Examples include boron, aluminum, antimony, zirconium, magnesium, or titanium. Under the appropriate conditions (e.g., pH and temperature), the crosslinks that form between gelling agent molecules may increase the viscosity of a treatment fluid.

The chemical nature of any resultant crosslinks, in part, determines the stability and Theological properties of the treatment fluid and, oftentimes, the applications to which the treatment fluid may be put. For example, boron crosslinking agents are frequently used in treatment fluids and are compatible with a number of gelling agents. But boron crosslinking agents are typically limited to use in environments that have a pH of about 8 and above and a temperature below about 300° F. This pH requirement may be problematic because, inter alia, it may preclude the use of seawater in the treatment fluid or the use of the treatment fluid in an offshore environment. Similarly, treatment fluids comprising gelling agents that are crosslinked with boron may suffer from thermal instability at certain elevated temperatures like those frequently encountered in some subterranean operations. In addition, boron crosslinking agents often react with additives commonly added to treatment fluids, e.g., glycols (such as ethylene or propylene glycol) and alcohols (such as methanol). To overcome this propensity, boron crosslinking agents are typically added in excess to treatment fluids, which may increase the environmental footprint and the costs associated with the treatment fluid.

Crosslinking agents that use metals other than boron, such as zirconium and titanium, are also frequently used in treatment fluids. These crosslinking agents generally form crosslinks that are more stable than those formed by boron crosslinking agents. Although treatment fluids that are crosslinked with non-boron crosslinking agents are more stable, they may be more difficult to break, thus making recovery of the fluid from the well bore more difficult.

SUMMARY

The present invention relates to methods and compositions for viscosifying fluids. More particularly, the present invention relates to networking agents, viscosified treatment fluids, and methods of using these compositions in applications wherein viscosified treatment fluids may be used.

In one embodiment, the present invention provides a method of increasing the viscosity of a treatment fluid comprising the steps of: adding a networking agent to the treatment fluid, wherein the networking agent is represented by the formula: Y—X—[B(OR)2]n, wherein: Y is at least partially capable of forming a crosslink between a gelling agent molecule, a second networking agent, and/or a combination thereof; X is at least partially capable of preventing or inhibiting a reaction represented by the formula: ROH+R'B(OR)2→R'OH+B(OR)3; R and R' are a hydrogen, an alkyl group, an aryl group, or a combination thereof; and n is a positive integer greater than or equal to 1; allowing at least one crosslink to form between the networking agent and a gelling agent molecule, a second networking agent, and/or a combination thereof; and allowing the viscosity of the treatment fluid to increase.

In another embodiment, the present invention provides a method of treating a portion of a subterranean formation comprising: providing a viscosified treatment fluid that comprises an aqueous-based fluid and a networking agent, wherein the networking agent is represented by the formula: Y—X—[B(OR)2]n, wherein Y is at least partially capable of forming a crosslink between a gelling agent molecule, a second networking agent, and/or a combination thereof; X is at least partially capable of preventing or inhibiting a reaction represented by the formula: ROH+R'B(OR)2→R'OH+B(OR)3; R and R' are a hydrogen, an alkyl group, an aryl group, or a combination thereof; n is a positive integer greater than or equal to 1; and treating a portion of the subterranean formation.

In another embodiment, the present invention provides a networking agent comprising a compound represented by the formula: Y—X—[B(OR)2]n, wherein Y is at least partially capable of forming a crosslink between a gelling agent molecule, a second networking agent, and/or a combination thereof; X is at least partially capable of preventing or inhibiting a reaction represented by the formula: ROH+R'B(OR)2→R'OH+B(OR)3; R and R' are a hydrogen, an alkyl group, an aryl group, or a combination thereof; and n is a positive integer greater than or equal to 1.

In another embodiment, the present invention provides a viscosified treatment fluid that comprises an aqueous-based fluid and a networking agent, wherein the networking agent is represented by the formula: Y—X—[B(OR)2]n, wherein Y is at least partially capable of forming a crosslink between a gelling agent molecule, a second networking agent, and/or a combination thereof; X is at least partially capable of preventing or inhibiting a reaction represented by the formula: ROH+R'B(OR)2→R'OH+B(OR)3; R and R' are, independently of one another, a hydrogen, an alkyl group, an aryl group, or a combination thereof; and n is a positive integer greater than or equal to 1.

The features and advantages of the present invention will be readily apparent to those skilled in the art upon a reading of the description of the embodiments that follows.

DESCRIPTION

The present invention relates to methods and compositions for viscosifying fluids. More particularly, the present invention relates to networking agents, viscosified treatment fluids, and methods of using these compositions in applications wherein viscosified treatment fluids may be used. The methods and compositions of the present invention are useful in a variety of applications in which it is desirable to increase the viscosity of a fluid. Examples include, but are not limited to, treatment fluids used in subterranean applications, such as drilling fluids, fracturing fluids, and gravel packing fluids. Although many of the embodiments of the present invention will be discussed in the context of subterranean applications, such discussion is only intended to illustrate some applications of the networking agents of the present invention. The networking agents of the present invention are suitable for many uses in which the viscosity of a fluid may be increased.

The networking agents of the present invention generally comprise compounds capable of forming a network in aqueous environments. The term "network," as used herein, generally refers to a supramolecular arrangement of atoms, ions, and/or molecules associated through atomic forces that are at least partially capable of increasing the viscosity of a fluid. Under appropriate conditions, e.g., pH and temperature, networking agents may form intermolecular crosslinks, intramolecular crosslinks, or a combination thereof. The term "crosslink(s)" or "crosslinking" refers to a comparatively short connecting unit (as in a chemical bond or chemically bonded group), in relation to a monomer, oligomer, or polymer, between neighboring chains of atoms in a complex chemical molecule, e.g., a polymer. Suitable networking agents of this invention that are capable of forming networks in aqueous environments are represented by Formula I:

$$Y-X-[B(OR)_2]_n \quad \text{Formula I}$$

wherein Y is a molecule that is capable of forming a crosslink; X is a molecule that capable of preventing or inhibiting the reaction represented by Reaction I:

$$ROH+R'B(OR)_2 \rightarrow R'OH+B(OR)_3 \quad \text{Reaction I}$$

R and R' may be, independently of one another, a hydrogen, an alkyl group, an aryl group, or a combination thereof; and n is a positive integer greater than or equal to one.

In certain embodiments of the networking agents of the present invention, n in Formula I may have a practical upper limit. Such an upper limit may be defined by the practicality of combining or adding n+1 molecules based on, for example, the properties of the resultant compound and the cost of producing the resultant compound. The practical upper limit of n will be apparent, with the benefit of this disclosure, to a person having ordinary skill in the art based on, e.g., the particular networking agent used, material costs, and fluid properties desired. In certain exemplary embodiments, n may be in the range of from about 1 to about 30. In other exemplary embodiments, n may be in the range of from about 2 to about 6.

In certain embodiments of the networking agents of the present invention, Y in Formula I may comprise one or more hydroxyl groups, carboxylic acid groups and derivatives thereof, sulfate groups, sulfonate groups, phosphate groups, phosphonate groups, amino groups, amidecarboxyl groups, or combinations thereof. In certain exemplary embodiments, Y may comprise a polysaccharide polymer, oligomer, or monomer having one or more of the following monosaccharide units: galactose, mannose, glucoside, glucose, xylose, arabinose, fructose, glucuronic acid, or pyranosyl sulfate. Examples of suitable polysaccharides include, but are not limited to, guar gum and derivatives thereof, such as hydroxypropyl guar and carboxymethylhydroxypropyl guar; cellulose and derivatives thereof, such as hydroxyethyl cellulose; xanthan gums; polyvinyl alcohol; or combinations thereof. In other exemplary embodiments, Y may comprise synthetic polymers that contain the above-mentioned functional groups. Examples of such synthetic polymers include, but are not limited to, polyacrylate, polymethacrylate, polyacrylamide, polyvinyl alcohol, polyvinylpyrrolidone, or a combination thereof.

In certain embodiments of the networking agents of the present invention, X in Formula I may comprise a group capable of stabilizing a boronic acid group. The term "boronic acid group" refers to the group in Formula I represented by: $-B(OR)_2$. Suitable groups for X in Formula I include, but are not limited to, aryl groups. In certain exemplary embodiments, the aryl group is a bi-aryl group (e.g., napthalene); tri-aryl group (e.g., anthracene), or a combination thereof. In other exemplary embodiments, the aryl group may be substituted (e.g., carboxy, chloro, fluoro, methoxy, methoxythio, naphthyl, tolyl, furyl); unsubstituted (e.g., benzyl, phenyl); or a combination thereof. Additionally, X may be tailored to achieve networking agents with certain desired properties, e.g., water solubility. For example, where water solubility is desired, X may comprise, e.g., a polyether represented by Formula II:

Formula II wherein q is a positive integer (e.g., in some embodiments, q may be in the range of from about 1 to about 30). In other embodiments, X may comprises a compound represented by Formula III:

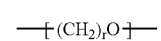

Formula III wherein r is a positive integer (e.g., in some embodiments, r may be in the range of from about 1 to about 30). In certain exemplary embodiments, Formula III may be substituted. For example, any methylene group in Formula III may be substituted by any epoxide ring, alkyl halides, carbonyl groups, amido groups, oxygen, sulfur, or combinations thereof.

In certain exemplary embodiments of the present invention, a networking agent of Formula I may comprise a compound represented by Formula IV:

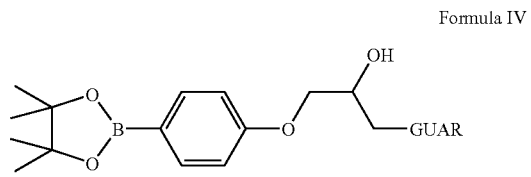

Formula IV

The networking agents of the present invention may be synthesized, with the benefit of this disclosure, using the relevant methods of preparative organic chemistry known to individuals skilled in the art. One example of a suitable synthesis is the Williamson ether synthesis. For a general discussion of the Williamson ether synthesis, see Jerry March, Advanced Organic Chemistry: Reactions, Mechanisms, and Structure 386-87 (John Wiley & Sons Inc., 4th ed. 1992), and for a list of procedures and reagents useful in the Williamson ether synthesis see Richard C. Larock, Comprehensive Organic Transformations 446-48 (Wiley-VCH, 2nd ed. 1989), both of which are incorporated herein by reference. In certain exemplary embodiments of the present invention, a networking agent of Formula IV may be synthesized by a reaction represented by Reaction II:

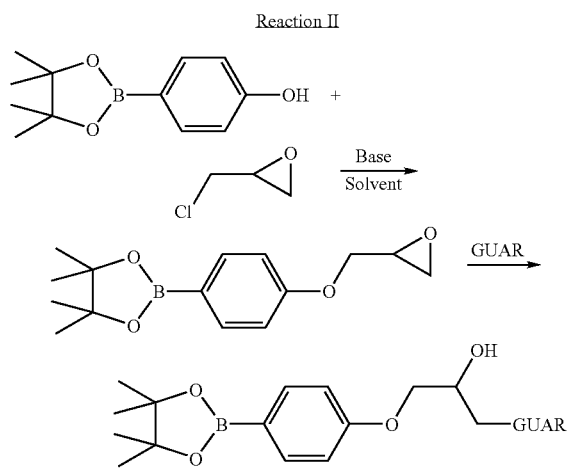

The viscosified treatment fluids of the present invention generally comprise an aqueous-based fluid and a networking agent of the present invention. The networking agents of the present invention, in certain embodiments, may allow for recovery and reuse of viscosified treatment fluids or their components. Such reuse includes the reuse of the viscosified treatment fluid in its entirety or any individual component or combination of components.

The aqueous-based fluids of the viscosified treatment fluids of the present invention may comprise fresh water, salt water (e.g., water containing one or more salts dissolved therein), brine (e.g., saturated salt water), seawater, or any combination thereof. The aqueous-based fluid can be from any source so long as it does not contain an excess of compounds that might adversely affect other components in the viscosified treatment fluid.

The networking agents present in the viscosified treatment fluids of the present invention may be crosslinked, partially crosslinked, uncrosslinked, or a combination thereof. For instance, the crosslinks may be between at least one networking agent molecule and another molecule capable of crosslinking with the networking agent. For example, crosslinks may form between at least two networking agent molecules, between a networking agent molecule and a gelling agent molecule, or a combination thereof. The networking agent is generally used in the viscosified treatment fluids of the present invention in an amount sufficient to increase the viscosity of the viscosified treatment fluid to a desired degree. In certain embodiments, the networking agents of the present invention are used in the viscosified treatment fluids of the present invention in the range of from about 0.1% to about 10% by weight of the aqueous-based fluid therein.

The viscosified treatment fluids of the present invention may further comprise gelling agents; crosslinking agents; crosslinked gelling agents, in which the crosslinked gelling agent is formed from a reaction comprising gelling agents and crosslinking agents; or a combination thereof. The gelling agents, crosslinking agents, and crosslinked gelling agents may be included in the viscosified treatment fluids of the present invention, inter alia, to tailor their viscosity to a desired degree. In certain embodiments, gelling agents added to a viscosified treatment fluid may be capable of crosslinking with a networking agent of the present invention. In other embodiments, gelling agents added to a viscosified treatment fluid may not be capable of crosslinking with a networking agent of the present invention.

When included, a variety of gelling agents can be used in conjunction with the viscosified treatment fluids of the present invention. Suitable gelling agents are often hydratable polymers that typically comprise biopolymers, synthetic polymers, and combinations thereof. Suitable gelling agents are often have one or more functional groups. These functional groups include, but are not limited to, hydroxyl groups, cis-hydroxyl groups, carboxylic acids, derivatives of carboxylic acids, sulfate groups, sulfonate groups, phosphate groups, phosphonate groups, amino groups, and amide groups. In certain exemplary embodiments, the gelling agents may be biopolymers comprising polysaccharides, and derivatives thereof, which contain one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are used in the viscosified treatment fluids of the present invention in an amount in the range of from about 0.01% to about 10% by weight of the aqueous-based fluid therein. In certain exemplary embodiments, the gelling agent is used in the viscosified treatment fluids of the present invention in an amount in the range of from about 1% to about 4% by weight of the aqueous-based fluid therein.

As mentioned above, crosslinking agents may be included in the viscosified treatment fluids of the present invention. When included, the crosslinking agents may be capable of crosslinking only gelling agent molecules, only networking agent molecules, both networking agent molecules and gelling agent molecules, or combinations thereof. Crosslinking agents typically comprise at least one metal. Examples of suitable crosslinking agents include, but are not limited to, boron compounds (e.g., boric acid, disodium octaborate tetrahydrate, sodium diborate and pentaborates, ulexite, and colemanite); zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds;

zinc compounds; or a combination thereof. An example of a suitable commercially available zirconium based crosslinking agents is "CL-24™" available from Halliburton Energy Services, Inc., Duncan, Okla. An example of a suitable commercially available titanium based crosslinking agents is "CL-39™" available from Halliburton Energy Services, Inc., Duncan Okla. An example of a suitable commercially available boron based crosslinking agents is "BC-140™" available from Halliburton Energy Services, Inc., Duncan Okla. Suitable crosslinking agents generally are used in the viscosified treatment fluids of the present invention in an amount sufficient to provide, inter alia, the desired degree of crosslinking between molecules. In certain embodiments of the present invention, the crosslinking agents may be used in the viscosified treatment fluids of the present invention in an amount in the range from about 0.001% to about 10% by weight of the aqueous-based fluid therein. Individuals skilled in the art, with the benefit of this disclosure, will recognize the exact type and amount of crosslinking agent to use depending on factors such as, the specific gelling agent, specific networking agent, desired viscosity, and formation conditions.

In some applications, after a viscosified treatment fluid has performed its desired function, its viscosity is reduced. For example, in a subterranean application, once the viscosified treatment fluid's viscosity is reduced, it may be flowed back to the surface, and the well may be returned to production. Reducing the viscosity of a viscosified treatment fluid may occur naturally over time or, e.g., by adjusting the pH of the viscosified treatment fluid so that crosslinks become unstable and the gelling agent and/or networking agent delink. The terms "delink" or "delinking," as used to herein, refers to the reversible removal of crosslinks between at least two molecules that are crosslinked. Delinking also may occur, independent of pH, through the addition of a compound capable of removing the metal associated with the crosslink. Such delinking is described in U.S. patent application Ser. No. 10/664,206 titled "Environmentally Benign Viscous Well Treating Fluids and Methods" filed Sep. 9, 2003 and U.S. patent application Ser. No. 10/794,607 titled "Methods and Compositions for Reducing the Viscosity of Treatment Fluids," filed Mar. 5, 2004, the disclosures of which are incorporated herein by reference.

The viscosified treatment fluids of the present invention may optionally comprise pH-adjusting agents. The pH-adjusting agents may be included in the viscosified treatment fluid to adjust the pH of the viscosified treatment fluid, inter alia, to facilitate the formation or delinking of crosslinks between networking agent molecules. Generally, crosslinks do not form between networking agents at or below about pH 7. Therefore, crosslinking or delinking may occur by adjusting the pH of the viscosified treatment fluid once it is placed in a desired location, e.g. in a subterranean well bore. In certain embodiments, where the pH is to be increased (e.g., to facilitate crosslinking), suitable pH-adjusting agents comprise a base. Example of suitable bases include, but are not limited to, sodium hydroxide, potassium hydroxide, lithium hydroxide, and a combination thereof. In other embodiments, where the pH is to be decreased (e.g., to facilitate delinking), suitable pH-adjusting agents include, but are not limited to, fumaric acid, formic acid, acetic acid, acetic anhydride, hydrochloric acid, hydrofluoric acid, hydroxyfluoboric acid, polyaspartic acid, polysuccinimide, and combinations thereof. The appropriate pH-adjusting agent and amount thereof used will depend upon the formation characteristics and conditions, on the breaking or crosslinking time desired, on the nature of the Y group of Formula I, and other factors known to individuals skilled in the art with the benefit of this disclosure.

Reducing the viscosity of a viscosified treatment fluid also may occur by "breaking" the viscosified treatment fluid. Breaking typically involves incorporating "breakers" such as acids, oxidizers, and enzymes in the viscosified treatment fluid. The viscosified treatment fluids of the present invention optionally may comprise breakers, e.g., to break crosslinks between gelling agents, between networking agents, and/or between networking agents and gelling agents. Suitable breakers include enzymes, oxidizers, and acids. In certain embodiments, the action of a breaker may be delayed for a desired period. Examples of such delayed breakers include, but are not limited to, various lactones, esters, encapsulated acids and slowly soluble acid generating compounds; oxidizers, which produce acids upon reaction with an aqueous-based fluid; water reactive metals, such as aluminum, lithium, and magnesium; and the like. Alternatively, any of the delayed breakers conventionally used with crosslinking agents may be used, for example, oxidizers such as sodium chlorite, sodium bromate, sodium persulfate, ammonium persulfate, encapsulated sodium persulfate, potassium persulfate, ammonium persulfate, and the like as well as magnesium peroxide. Enzyme breakers that may be employed include, but are not limited to, alpha and beta amylases, amyloglucosidase, invertase, maltase, cellulase, and hemicellulase, and combinations thereof. The specific breaker used, whether or not it is encapsulated, and the amount thereof employed, will depend upon the breaking time desired, the nature of the gelling agent and crosslinking agent, formation characteristics and conditions, and other factors known, with the benefit of this disclosure, to individuals skilled in the art.

In addition, the viscosified treatment fluids of the present invention may further comprise a buffer. Examples of suitable buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. The buffer generally is present in the crosslinked viscosified treatment fluids of the present invention in an amount sufficient to maintain the pH of such viscosified treatment fluids at a desired level. One of ordinary skill in the art, with the benefit of this disclosure, will recognize the appropriate buffer and amount of the buffer to use for a chosen application.

The viscosified treatment fluids of the present invention optionally may comprise particulates suitable for subterranean applications. In certain exemplary embodiments, the particulates used may be included in the viscosified treatment fluids of the present invention to form a gravel pack down hole, as a proppant particulate in fracturing operations, or as a bridging agent in a fluid loss control operation. Suitable particulates include, for example, sand; nut shells; seed shells; resinous materials; a combination of nut shells or seed shells with a resinous material; bauxite; ceramic materials; glass materials; polymeric materials; "Teflon®" materials; fruit pits; processed wood; composite particulates prepared from a binder and filler particulates (such as silica, alumina, fumed carbon, carbon black, graphite, mica, titanium dioxide, meta-silicate, calcium silicate, kaolin, talc, zirconia, boron, fly ash, hollow glass microspheres, and solid glass); mixtures thereof, and the like. The particulates may be used in conjunction with a curable resin and/or a suitable tackifier. The particulate size generally may range from about 2 mesh to about 400 mesh on the U.S. Sieve Series; however, other sizes may be desired and will be entirely suitable for practice of the present invention.

Additional additives may be present in the viscosified treatment fluids of the present invention as deemed appropriate by one skilled in the art with the benefit of this disclosure. Examples of such additives include, but are not limited to, surfactants, scale inhibitors, clay stabilizers, silicate-control agents, gases, antifoaming agents, foaming agents, storage stabilizers, biocides, biostatic agents, weighting agents, or a combination thereof.

The viscosified treatment fluids of the present invention can be utilized for carrying out a variety of subterranean well treatments, including, but not limited to, fracturing and gravel packing subterranean formations. In some embodiments, in which the viscosified treatment fluids of the present invention are used in conjunction with fracturing operations, a fracturing fluid of the present invention that comprises an aqueous-based fluid and a networking agent of this invention may be placed in a subterranean formation at a sufficient pressure to create or enhance one or more fractures therein. After the fracturing fluid has performed its desired function, or after a desired period of time, the viscosity of the fracturing fluid may be reduced, and the fracturing fluid may be recovered. In other embodiments, in which the viscosified treatment fluids of the present invention are used in conjunction with gravel packing operations, a gravel packing fluid of this invention that comprises an aqueous-based fluid, gravel particulates, and a networking agent of this invention is placed in a portion of a well bore so as to create a gravel pack neighboring a portion of the formation. After a suitable time, e.g., after the gravel pack is substantially in place, the viscosity of the gravel packing fluid may be reduced and the gravel packing fluid recovered.

In certain embodiments, the present invention also provides methods of reusing viscosified treatment fluids of this invention or any individual component or combination of components therein. Viscosified treatment fluids of the present invention may be reused because the crosslinks created by the networking agents of the present invention may be delinked. In certain embodiments, reuse of the viscosified treatment fluids of the present invention involves delinking the viscosified treatment fluid a sufficient degree so as to reduce the viscosity of the viscosified treatment fluid. After delinking, the delinked viscosified treatment fluid may be reused, e.g., by crosslinking the delinked viscosified treatment fluid. Likewise, one or more components of the delinked viscosified treatment fluid, e.g., the aqueous-based fluid therein, may be reused after delinking. The term "delinked viscosified treatment fluid" refers to a viscosified treatment fluid where at least one crosslinked networking agent as been delinked resulting in at least two networking agent molecules. In certain embodiments, for example, the networking agent may be removed from the delinked viscosified treatment fluid by filtration, and the aqueous-based fluid reused. Reusing viscosified treatment fluids is described U.S. patent application Ser. No. 10/794,607 titled "Methods and Compositions for Reducing the Viscosity of Treatment Fluids," filed Mar. 5, 2004, the relevant disclosure of which is incorporated herein by reference.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of treating a portion of a subterranean formation comprising:
providing a viscosified treatment fluid that comprises an aqueous-based fluid and a networking agent, wherein the networking agent comprises a boronic acid group and is represented by the formula: $Y-X-[B(OR)_2]_n$, wherein
Y is at least partially capable of forming a crosslink between at least one member selected from the group consisting of a gelling agent molecule and a second networking agent,
X is at least partially capable of preventing or inhibiting a reaction represented by the formula: $ROH+R'B(OR)_2 \rightarrow R'OH+B(OR)_3$, and comprises a compound represented by the formula

wherein q is a positive integer greater or equal to 1 or a compound represented by the formula

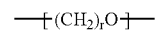

wherein r is a positive integer greater or equal to 1,
R and R' are independently selectable from the group consisting of a hydrogen, an alkyl group, an aryl group, or a combination thereof,
the boronic acid group comprises at least one group selected from the group consisting of: an alkyl group, an aryl group, and a combination thereof, and
n is a positive integer greater than or equal to 1; and
treating a portion of the subterranean formation.

2. The method of claim 1 wherein n is in the range of from about 1 to about 30.

3. The method of claim 1 wherein Y comprises at least one group selected from the group consisting of a hydroxyl group, a carboxylic acid group, a derivative of a carboxylic acid group, a sulfate group, a sulfonate group, a phosphate group, a phosphonate group, an amino group, and an amidecarboxyl group.

4. The method of claim 1 wherein Y comprises at least one member selected from the group consisting of: a polymer, an oligomer of the polymer, and a monomer of the polymer.

5. The method of claim 4 wherein the polymer comprises a synthetic polymer, or a polysaccharide.

6. The method of claim 1 wherein X comprises a compound represented by the formula:

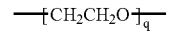

wherein q is a positive integer greater or equal to 1.

7. The method of claim 1 wherein X comprises a compound represented by the formula:

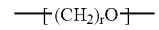

wherein r is a positive integer greater or equal to 1.

8. The method of claim 1 wherein the aqueous-based fluid comprises at least one fluid selected from the group consisting of: fresh water, salt water, brine, seawater, and a derivative thereof.

9. The method of claim 1 wherein the viscosified treatment fluid comprises a crosslinked networking agent.

10. The method of claim 9 wherein the crosslinked networking agent comprises at least one molecule selected from the group consisting of a networking agent molecule and a gelling agent molecule.

11. The method of claim 1 wherein the networking agent is present in the viscosified treatment fluid in the range of from about 0.1% to about 10% by weight of the aqueous-based fluid therein.

12. The method of claim 1 wherein the viscosified treatment fluid further comprises a gelling agent.

13. The method of claim 12 wherein the gelling agent comprises at least one functional group selected from the group consisting of: a hydroxyl group, a cis-hydroxyl group, a carboxylic acid, a derivative of a carboxylic acid, a sulfate group, a sulfonate group, a phosphate group, a phosphonate group, an amino group, and an amide group.

14. The method of claim 12 wherein the gelling agent comprises at least one polysaccharide selected from the group consisting of guar gum, a derivative of guar gum, hydroxypropyl guar, carboxymethylhydroxypropyl guar, a cellulose derivative, and hydroxyethyl cellulose.

15. The method of claim 12 wherein the gelling agent comprises at least one polymer selected from the group consisting of polyacrylate, polymethacrylate, polyacrylamide, polyvinyl alcohol, and polyvinylpyrrolidone.

16. The method of claim 12 wherein the gelling agent is present in an amount in the range of from about 0.01% to about 10% by weight of the aqueous-based fluid therein.

17. The method of claim 1 wherein the viscosified treatment fluid comprises a crosslinking agent.

18. The method of claim 17 wherein the crosslinking agent is capable of crosslinking gelling agent molecules, networking agent molecules, or both networking agent molecules and gelling agent molecules.

19. The method of claim 17 wherein the crosslinking agent comprises at least one compound selected from the group consisting of: a boron compound, a zirconium compound, a titanium compound, an aluminum compound, an antimony compound, a chromium compound, an iron compound, a copper compound, and a zinc compound.

20. The method of claim 17 wherein the crosslinking agent is present in an amount in the range from about 0.001% to about 10% by weight of the aqueous-based fluid therein.

21. The method of claim 1 wherein the viscosified treatment fluid comprises a crosslinked gelling agent.

22. The method of claim 21 wherein the crosslinked gelling agent is formed from a reaction comprising a gelling agent molecule and a crosslinking agent.

23. The method of claim 1 wherein the viscosified treatment fluid further comprises at least one additive selected from the group consisting of a pH adjusting agent, a buffer, a breaker, a delinker, a surfactant, a scale inhibitor, a clay stabilizer, a silicate-control agent, a gas, an antifoaming agent, a foaming agent, a storage stabilizer, a biocide, and a biostatic agent.

24. The method of claim 1 wherein the viscosified treatment fluid further comprises at least one material selected from the group consisting of: sand; nut shells; seed shells; resinous materials; a combination of nut shells or seed shells with a resinous material; bauxite; ceramic materials; glass materials; polymeric materials; polytetrafluoroethylene materials; fruit pits; processed wood; and composite particulates prepared from a binder and filler particulates.

25. The method of claim 1 wherein the treating the portion of the subterranean formation involves a fracturing or gravel packing operation.

26. A method of treating a portion of a subterranean formation comprising:
providing a viscosified treatment fluid that comprises an aqueous-based fluid and a networking agent, wherein the networking agent is represented by the formula: Y—X—[B(OR)$_2$]$_n$, wherein
Y is at least partially capable of forming a crosslink between at least one member selected from the group consisting of a gelling agent molecule and a second networking agent,
X comprises at least one compound represented by at least one formula selected from the group consisting of:

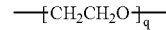

and

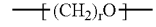

R is independently selectable from the group consisting of a hydrogen, an alkyl group, an aryl group, or a combination thereof, and
n, q, and r are independently selectable from a positive integer greater than or equal to 1; and
treating a portion of the subterranean formation.

27. A method of treating a portion of a subterranean formation comprising: providing a viscosified treatment fluid that comprises an aqueous-based fluid and a networking agent, wherein the networking agent comprises a compound represented by the following formula:

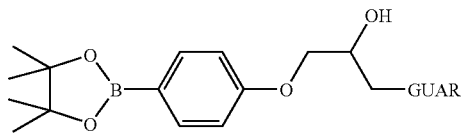

and treating a portion of the subterranean formation.

* * * * *